Patented Jan. 22, 1946

2,393,261

UNITED STATES PATENT OFFICE 2,393,261

CREAMING OF SYNTHETIC RUBBER LATICES

Charles R. Peaker, Union City, Conn., assignor to United States Rubber Company, New York, N. Y., a corporation of New Jersey No Drawing. Application July 1, 1944,
Serial No. 543,197

10 Claims. (Cl. 260—32)

This invention relates to improvements in the creaming of synthetic rubber latices.

Synthetic rubber latices, as is known, may be prepared by the emulsion polymerization in an aqueous medium of butadienes-1,3, or mixtures of butadienes-1,3 with other polymerizable compounds capable of forming copolymers with butadienes-1,3. Such aqueous emulsion polymerizates, or synthetic rubber latices, may be creamed by the addition of a hydrophilic colloidal creaming agent such as a vegetable mucilage, as used for creaming natural rubber latex, which will cause the dispersion on standing to separate into a polymer-rich fraction and a polymer-poor fraction, which fractions may be separated from each other by simple mechanical means, such as decantation, drawing off, and the like.

By the present invention, there is obtained an increase in the concentration of synthetic rubber in the polymer-rich or cream fraction in the creaming of synthetic rubber latices with hydrophilic colloidal creaming agents.

In carrying out the present invention, the creaming operation is carried out in the presence of an alkali silicate in addition to the hydrophilic colloidal creaming agent. The silicate may be added to the emulsion of the monomeric materials before polymerization, or to the completed synthetic rubber latex or emulsion polymerizate. The hydrophilic colloidal creaming agent may be the conventional vegetable mucilages used in the creaming of natural latex, for example, alginates, locust seed or carob bean gum, pectates, Karaya gum, Irish moss, and the like. These vegetable mucilages may be used in amounts between .05 to 1% based on the water phase of the synthetic rubber latex, similarly to the creaming of natural rubber latex. The alkali silicate may be any of the commercial silicates having varying proportions of sodium or potassium oxide to silicon dioxide content. For example, "N" brand sodium silicate (Philadelphia Quartz Co.) is sold in the form of an aqueous solution of about 38% solids content, in which ratio $Na_2O:SiO_2$ is about 1:3.2. "U" brand sodium silicate (Philadelphia Quartz Company) is sold in the form of a 47% aqueous solution in which the ratio $Na_2O:SiO_2$ is about 1:2.4. "KaSil" brand potassium silicate (Philadelphia Quartz Co.) is sold in the form of a 27% aqueous solution in which the ratio $K_2O:SiO_2$ is about 1:2.5. Various other silicates, such as sodium meta silicate ($Na_2O.SiO_2$) and ordinary water glass ($Na_2O.4SiO_2$) may be used. The amount of sodium silicate added may vary over wide ranges, as for example, from 2 to 20 parts of alkali metal silicate (solids) per 100 parts of solids of the synthetic rubber latex.

In the preparation of the synthetic rubber latex, as is known, polymerizable monomeric compounds are emulsified in an aqueous medium by means of an emulsifying agent, such as a soap or other surface active agent, and the polymerization is made to take place generally at elevated temperatures in the presence of a catalyst and other regulating materials. Examples of such polymerizable material are the various butadienes-1,3, for example, butadiene-1,3, methyl-2-butadiene-1,3, (isoprene), chloro-2-butadiene-1,3 (chloroprene), piperylene, 2,3-dimethyl-butadiene-1,3. The polymerizable material as known may be a mixture of such a butadiene-1,3 with another polymerizable compound which is capable of forming a copolymer with butadienes-1,3, for example, a compound which contains a

group where at least one of the disconnected valences is attached to an electro-active group, that is, a group which substantially increases the electrical dissymmetry or polar character of the molecule. Examples of compounds which contain a

group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride. Present day commercial synthetic rubbers of the above types are polymerized chloro-2-butadiene-1,3, known as neoprene or GRM rubber, copolymers of butadiene-1,3 and styrene, known as Buna S or GRS rubber, and copolymers of butadiene-1,3 and acrylonitrile, known as Buna N or GRN rubber.

The following examples are illustrative of the present invention. Each creaming reported in the examples is the optimum of a series of creamings with varying amounts of the creaming agent, whether in the absence of a silicate as in the controls, or with the addition of specified amounts of silicates as in the illustrations of the invention.

Example I

A 40% solids Buna S latex was prepared by polymerizing an aqueous emulsion of 50 parts by weight of butadiene-1,3 and 50 parts by weight of styrene in the presence of 5 parts by weight of potassium soap of wood rosin as an emulsifying agent and small amounts of conventional oxidizing catalyst and aliphatic mercaptan regulator. 2 more parts by weight of the soap were added after polymerization for further stabilizing the latex.

Portions of this Buna latex were creamed with various amounts at 2% aqueous ammonium alginate solution equivalent to .1 to .5% dry ammonium alginate based on the water phase of the latex, with and without the addition of alkali silicate. A control series of runs were creamed for three days at room temperature (about 21° C.), using the creaming agent alone as in prior practice. Three other series of runs were made with the addition of 25 parts of "N" brand sodium silicate solution per 100 parts of latex solids. These were allowed to cream for three days at room temperature, and at 25° C. and 50° C. respectively. A further series of three room temperature creamings were made with the addition of 15, 20 and 30 parts of "N" brand sodium silicate solution per 100 parts of latex solids. The optimum results are shown in the following table:

| Parts "N" brand sodium silicate solution added | Temperature °C. | Per cent serum separation | Per cent total solids in cream |
|---|---|---|---|
| None (control) | 21 | 21.4 | 49.4 |
| 25 | 21 | 39.1 | 58.9 |
| 25 | 25 | 43.1 | 60.3 |
| 25 | 50 | 44.0 | 61.3 |
| 15 | 21 | 38.1 | 56.5 |
| 20 | 21 | 37.2 | 58.8 |
| 30 | 21 | 41.4 | 58.9 |

It is evident from the above table that the addition of sodium silicate with the hydrophilic colloidal creaming agent increases considerably the solids concentration of the cream. It is also shown that although the higher temperatures may increase the concentration of the cream to some extent, temperature variations are not critical and the process may be operated at any desired temperature. It is further shown that the amount of silicate added is not critical.

*Example II*

In a series of creamings on a Buna S latex similar to that of Example I with ammonium alginate, were added various alkali silicates. The creamings in this and the following examples, except Example V, were carried out at room temperature for a sufficient time to reach equilibrium, generally about 2 to 3 days. The initial solids of the latex prior to creaming was 36 to 38%, so that the percentage serum separated in each case is the direct measure of the efficiency of the creaming, the higher the serum separation, the more efficient the creaming and the higher the polymer content of the cream. Solids concentrations of the various creams in this run were not made. The percentage serum separations are shown in the following table:

| Alkali silicate added | | Per cent serum separation |
|---|---|---|
| Type | Parts per 100 parts latex solids | |
| None (control) | | |
| "N" brand 38% sodium silicate solution | 25 | 23.3 |
| "U" brand 47% sodium silicate solution | 20 | 35.0 |
| "KaSil" brand 27% potassium silicate solution | 34 | 29.9 |
| Crystalline sodium meta silicate | 5 | 41.9 |
|  |  | 41.0 |

It is apparent that the various alkali silicates increase the efficiency of creaming of Buna S latices. It is preferred to use those silicates which are relatively high in silica content since these impart only a mild alkalinity to the latex and are therefore readily added to synthetic rubber latices without difficulty. In addition, silicates of relatively high silica content, after being dried, are not readily redispersed in water, and hence their presence in a dried film of the synthetic rubber latex would not contribute to excessive water absorption which would be undesirable in many cases.

*Example III*

In this case a creaming agent different from that of Examples I and II, namely, locust seed or carob bean gum, was used. The creaming agent was dissolved in cold water to give a 2% aqueous solution and sufficient of the solution was added to give a series of runs having an equivalent dry locust bean gum content of about .1 to .3% based on the water phase of the latex. A latex similar to that of Example I was used and the solids content prior to creaming was 36% to 38%. Optimum creaming with the locust bean gum alone gave 14.3% serum separation with a 41.0% total solids cream, whereas the addition of 25 parts of "N" brand sodium silicate solution per 100 parts solids of the latex gave an optimum serum separation of 26.1% with a total solids cream of 45.8%. It is apparent that the present improvement is applicable to the creaming of synthetic rubber latices with various conventional creaming agents.

*Example IV*

In this case a different Buna S latex from that of the previous examples was used. A 26.7% solids Buna S latex was prepared by polymerizing an aqueous emulsion of 75 parts by weight of butadiene-1,3 and 25 parts by weight of styrene in the presence of 5 parts of sodium stearate as an emulsifying agent and small amounts of conventional oxidizing catalyst and aliphatic mercaptan regulator.

The latex was creamed with varying amounts of 2% ammonium alginate solution equivalent to .1 to .5% dry ammonium alginate based on the water phase of the latex, with and without the further addition of 25 parts of "N" brand 38% sodium silicate solution per 100 parts of latex solids. The solids concentration of the latex samples before creaming was about 25%.

A further series of runs was also made on a similar latex of 25.9% total solids with varying amounts of ammonium alginate and 15, 20 and 45 parts respectively of "N" brand 38% sodium silicate solution. The latex solids before creaming was about 22% to 23%.

The results of optimum creamings in this series are shown in the following table:

| Parts "N" brand sodium silicate solution added | Per cent total solids in latex before creaming | Per cent serum separation | Per cent total solids in cream |
|---|---|---|---|
| None (control) | 24.9 | 37.0 | 38.4 |
| 25 | 24.5 | 44.9 | 45.1 |
| 15 | 22.8 | 51.3 | 47.3 |
| 20 | 22.3 | 54.5 | 48.1 |
| 45 | 22.9 | 54.5 | 52.5 |

It is evident from the above that a considerable increase in the total solids content of the cream with various Buna S latices is effected by creaming in the presence of sodium silicate.

*Example V*

In this case, the alkali silicate was added to the emulsion of monomeric materials before polymerization to the Buna S latex. An emulsion was prepared containing 50 parts by weight of butadiene-1,3 and 50 parts by weight of styrene, dispersed with 5 parts by weight of potassium soap of wood rosin in 200 parts by weight of water, and containing small amounts of conventional oxidizing catalyst and aliphatic mercaptan regulator. To a portion of this emulsion of the monomeric materials was added 5 parts by weight of "N" brand sodium silicate solution per 100 parts of polymerizable material. To another (control) portion no silicate was added. Both portions were polymerized 18 hours at 65° C., after which the unreacted butadiene-1,3 and styrene monomers were removed in the conventional manner by venting off the butadiene-1,3 followed by steam distillation of the styrene. In both cases the conversion to the butadiene-1,3 and styrene copolymer in the latex was 92 to 93% complete.

The control and silicate treated portions were creamed at room temperature for 24 hours with varying amounts of 2% ammonium alginate solution equivalent to .1 to .3% dry ammonium alginate based on the water phase of the latex.

The results of optimum creamings in the two series of runs are shown in the following table:

| Parts "N" brand sodium silicate solution added | Per cent total solids in latex before creaming | Per cent solids in cream |
| --- | --- | --- |
| None (control) | 19.0 | 39.2 |
| 5 | 21.6 | 45.5 |

It is evident that the addition of the alkali silicate before emulsion polymerization as well as after emulsion polymerization improves creaming of synthetic rubber latices with hydrophilic colloidal creaming agents.

*Example VI*

A 42% solids Buna N latex was prepared by polymerizing an aqueous emulsion of 60 parts by weight of butadiene-1,3 and 40 parts by weight of acrylic nitrile in the presence of 7% of the potassium soap of a dehydrogenated, distilled rosin as an emulsifying agent, and small amounts of oxidizing catalyst and conventional aliphatic mercaptan regulator. In this case the addition of sodium silicate tended to somewhat destabilize the latex and hence the latex was more completely stabilized by the addition of 2 parts of a commercial stabilizer "Aquarex D" (sodium lauryl sulphate) per 100 parts of the latex.

The latex was creamed with varying amounts of ammonium alginate from .05 to .20% based on the water phase of the latex with and without the addition of 25 parts by weight of "N" brand 38% sodium silicate solution per 100 parts of the latex solids.

The results of optimum creaming in the two runs is shown in the following table.

| Parts "N" brand sodium silicate solution added | Per cent total solids in latex before creaming | Per cent serum separation | Per cent total solids in cream |
| --- | --- | --- | --- |
| None (control) | 40.0 | 24.5 | 52.4 |
| 25 | 37.2 | 31.8 | 53.6 |

The above shows improvement in the creaming of Buna N latex, even with a relatively high solids content latex as the starting material.

*Example VII*

In this case a commercial 50% solids dispersion of polymerized chloro-2-butadiene-1,3 sold under the name of "Neoprene Latex" was creamed with varying amounts from .05 to .20% ammonium alginate based on the water phase of the latex, with and without 10 parts of "N" brand 38% sodium silicate solution per 100 parts of latex solids. Due to the density of the polymerized chloro-2-butadiene-1,3 being greater than 1, the serum in these cases was above the concentrated or cream portion.

The results of optimum creamings in the two series of runs are shown in the following table:

| Parts "N" brand sodium silicate solution added | Per cent total solids in latex before creaming | Per cent serum separation | Per cent total solids in cream |
| --- | --- | --- | --- |
| None (control) | 49.1 | 22.3 | 60.9 |
| 10 | 48.0 | 27.3 | 62.3 |

The above shows a considerable improvement in the total solids of the cream of neoprene latex even with creaming from a very high initial solids content latex.

The effect of alkali silicates on the creaming of natural rubber latex is very different from and actually opposite to, the effect of sodium silicate on synthetic rubber latices as exemplified above. Sodium silicate retards the creaming of natural rubber latex with hydrophilic colloidal creaming agents as illustrated in the following:

A 36% total solids natural rubber latex was creamed with varying amounts of ammonium alginate from .03 to .10% based on the water phase of the latex, with and without the addition of 15, 25 and 45 parts respectively of "N" brand 38% sodium silicate solution per 100 parts of the latex solids. The latex solids before creaming was about 32-33%. The results of optimum creamings, which were all at an alginate concentration of less than the maximum .10% used (showing adequate creaming agent present) are set forth in the following table:

| Parts "N" brand sodium silicate solution added | Per cent serum separation | Per cent total solids in cream |
| --- | --- | --- |
| None (control) | 51.2 | 65.4 |
| 15 | 4.7 | 34.8 |
| 25 | 28.0 | 38.1 |
| 45 | 30.8 | 41.4 |

It may be seen from the above table, as distinguished from the case of synthetic rubber latices, the total solids in a natural rubber latex cream is decreased by the presence of sodium silicate in the creaming operation.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:
  1. The improvement in the creaming with a hydrophilic colloidal creaming agent of a synthetic rubber latex comprising an aqueous soap emulsion polymerizate of polymerizable material selected from the group consisting of butadiene-1,3, methyl-2-butadiene-1,3, chloro-2-butadiene-1,3, piperylene and 2,3-dimethyl-butadiene-1,3 and mixtures of such butadienes-1,3 with other polymerizable compounds capable for forming copolymers with butadienes-1,3 which comprises carrying out the creaming operation in the presence of a hydrophilic colloidal creaming agent and an alkali silicate.

2. The improvement in the creaming with a hydrophilic colloidal creaming agent of a synthetic rubber latex compressing an aqueous soap emulsion polymerizate of polymerizable material selected from the group consisting of butadiene-1,3, methyl-2-butadiene-1,3, chloro-2-butadiene-1,3, piperylene and 2,3-dimethyl-butadiene-1,3 and mixtures of such butadienes-1,3 with a compound which contains a

group and is copolymerizable with butadienes-1,3 which comprises carrying out the creaming operation in the presence of a hydrophilic colloidal creaming agent and an alkali silicate.

3. The improvement in the creaming with a vegetable mucilage of a synthetic rubber latex comprising an aqueous soap emulsion polymerizate of a mixture of butadiene-1,3 and styrene which comprises carrying out the creaming operation in the presence of a vegetable mucilage and an alkali silicate.

4. The improvement in the creaming with a vegetable mucilage of a synthetic rubber latex comprising an aqueous soap emulsion polymerizate of a mixture of butadiene-1,3 and acrylonitrile which comprises carrying out the creaming operation in the presence of a vegetable mucilage and an alkali silicate.

5. The improvement in the creaming with a vegetable mucilage of a synthetic rubber latex comprising an aqueous soap emulsion polymerizate of chloro-2-butadiene-1,3 which comprises carrying out the creaming operation in the presence of a vegetable mucilage and an alkali silicate.

6. A process for treating a synthetic rubber latex comprising an aqueous soap emulsion polymerizate of polymerizable material selected from the group consisting of butadiene-1,3, methyl-2-butadiene-1,3, chloro-2-butadiene-1,3, piperylene and 2,3-dimethyl-butadiene-1,3 and mixtures of such butadienes-1,3 with other polymerizable compounds capable of forming copolymers with butadienes-1,3 which comprises allowing such an aqueous emulsion polymerizate containing a hydrophilic colloidal creaming agent and an alkali silicate to stand until it separates into a polymer-rich fraction and a polymer-poor fraction, and separating said fractions from each other.

7. A process for treating a synthetic rubber latex comprising an aqueous soap emulsion polymerizate of polymerizable material selected from the group consisting of butadiene-1,3, methyl-2-butadiene-1,3, chloro-2-butadiene-1,3, piperylene and 2,3-dimethyl-butadiene-1,3 and mixtures of such butadienes-1,3 with a compound which contains a

group and is copolymerizable with butadienes-1,3 which comprises allowing such an aqueous emulsion polymerizate containing a hydrophilic colloidal creaming agent and an alkali silicate to stand until it separates into a polymer-rich fraction and a polymer-poor fraction, and separating said fractions from each other.

8. A process for treating a synthetic rubber latex comprising an aqueous soap emulsion polymerizate of a mixture of butadienes-1,3 and styrene which comprises allowing such an aqueous emulsion polymerizate containing a hydrophilic colloidal creaming agent and an alkali silicate to stand until it separates into a polymer-rich fraction and a polymer-poor fraction, and separating said fractions from each other.

9. A process for treating a synthetic rubber latex comprising an aqueous soap emulsion polymerizate of a mixture of butadienes-1,3 and acrylonitrile which comprises allowing such an aqueous emulsion polymerizate containing a hydrophilic colloidal creaming agent and an alkali silicate to stand until it separates into a polymer-rich fraction and a polymer-poor fraction, and separating said fractions from each other.

10. A process for treating a synthetic rubber latex comprising an aqueous soap emulsion polymerizate of chloro-2-butadiene-1,3 which comprises allowing such an aqueous emulsion polymerizate containing a hydrophilic colloidal creaming agent and an alkali silicate to stand until it separates into a polymer-rich fraction and a polymer-poor fraction, and separating said fractions from each other.

CHARLES R. PEAKER.